(12) United States Patent
Gibbons

(10) Patent No.: US 7,243,922 B2
(45) Date of Patent: Jul. 17, 2007

(54) DRILL CHUCK TOOL BIT LOCATOR

(75) Inventor: Louis A Gibbons, Stevensville, MD (US)

(73) Assignee: Black & Decker Inc., Newark, DE (US)

( * ) Notice: Subject to any disclaimer, the term of this patent is extended or adjusted under 35 U.S.C. 154(b) by 84 days.

(21) Appl. No.: 11/357,798

(22) Filed: Feb. 17, 2006

(65) Prior Publication Data

US 2006/0186615 A1    Aug. 24, 2006

Related U.S. Application Data

(60) Provisional application No. 60/654,848, filed on Feb. 18, 2005.

(51) Int. Cl.
*B23B 31/107* (2006.01)

(52) U.S. Cl. .............. 279/62; 279/38; 279/61; 279/63; 279/155

(58) Field of Classification Search ............... 279/38, 279/61–63, 155, 156; *B23B 31/107*
See application file for complete search history.

(56) References Cited

U.S. PATENT DOCUMENTS

| 1,304,658 | A | * | 5/1919 | Cobey | 279/63 |
|---|---|---|---|---|---|
| 1,304,659 | A | * | 5/1919 | Cobey | 279/63 |
| 1,741,507 | A | * | 12/1929 | Orazio | 408/140 |
| 2,555,419 | A | * | 6/1951 | Reaves et al. | 279/16 |
| 4,571,132 | A | * | 2/1986 | Bunge | 409/234 |
| 4,958,840 | A | * | 9/1990 | Palm | 279/62 |
| 4,968,191 | A | * | 11/1990 | Palm | 408/124 |
| 5,062,749 | A | * | 11/1991 | Sheets | 279/75 |
| 6,199,872 | B1 | * | 3/2001 | Hasan | 279/30 |
| 6,270,085 | B1 | * | 8/2001 | Chen et al. | 279/22 |
| 6,325,393 | B1 | * | 12/2001 | Chen et al. | 279/22 |
| 6,457,916 | B2 | * | 10/2002 | Wienhold | 408/240 |
| 6,554,292 | B1 | * | 4/2003 | Rohm | 279/137 |
| 6,722,667 | B2 | * | 4/2004 | Cantlon | 279/22 |
| 6,851,678 | B2 | * | 2/2005 | Mack | 279/62 |
| 6,920,810 | B1 | * | 7/2005 | Thompson et al. | 81/177.85 |
| 6,929,266 | B2 | * | 8/2005 | Peters et al. | 279/82 |
| 6,953,196 | B1 | * | 10/2005 | Huang | 279/75 |
| 6,966,562 | B1 | * | 11/2005 | Wienhold | 279/75 |
| 6,966,730 | B1 | * | 11/2005 | Miyanaga | 408/204 |

* cited by examiner

*Primary Examiner*—Monica Carter
*Assistant Examiner*—Sara Addisu
(74) *Attorney, Agent, or Firm*—Harness, Dickey & Pierce, P.L.C.

(57) ABSTRACT

A drill chuck having an adjustable depth stop to control an amount by which a tool bit, such as a drill or a screwdriver bit, is inserted into the drill chuck. The adjustable depth stop can include a spring, such as a conical spring, that can be coupled to a spindle of the chuck.

24 Claims, 3 Drawing Sheets

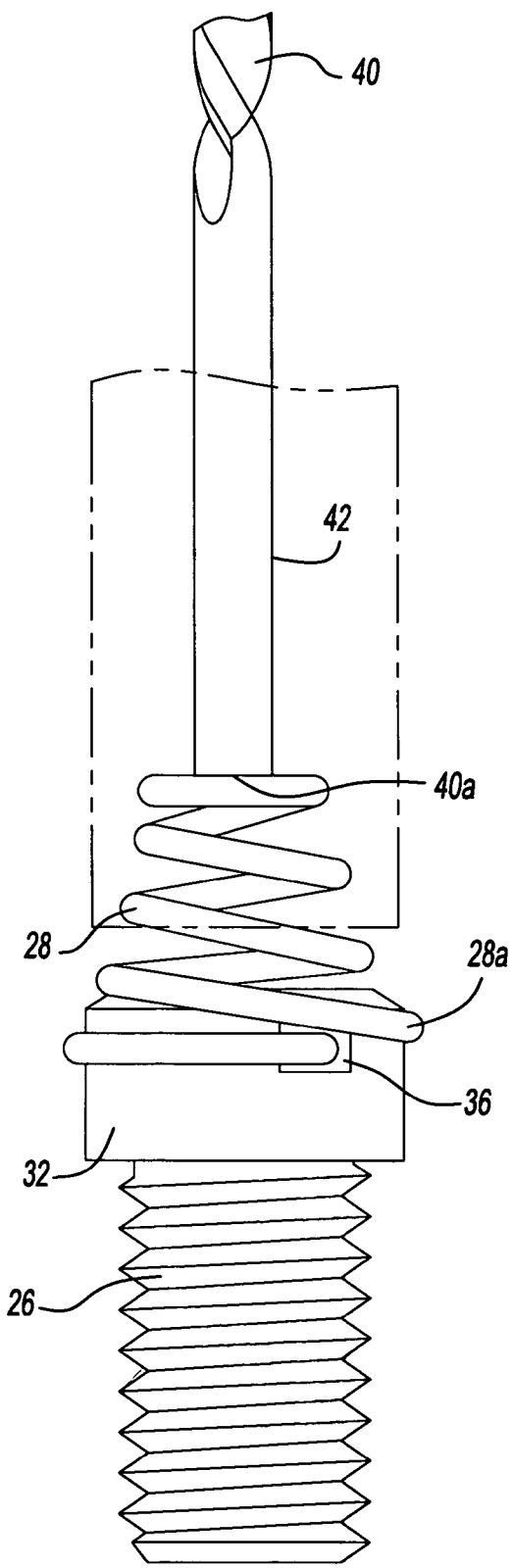
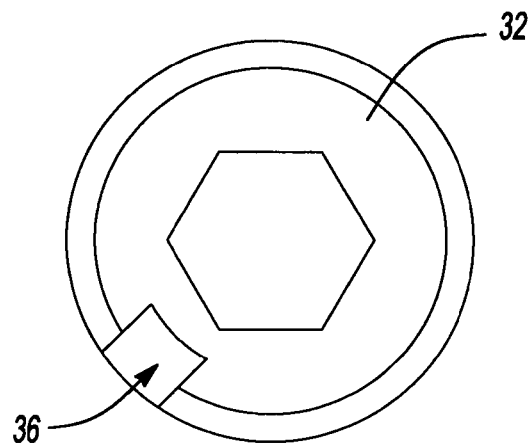
Fig-3
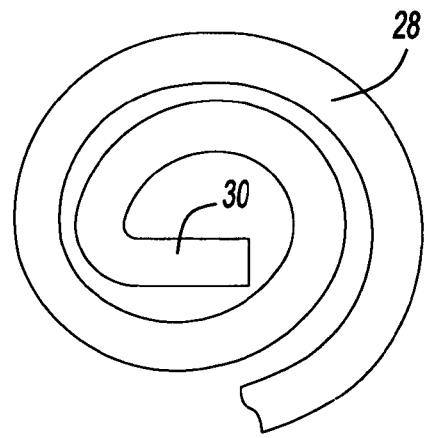
Fig-4
Fig-2

DRILL CHUCK TOOL BIT LOCATOR

CROSS-REFERENCE TO RELATED APPLICATIONS

This application claims the benefit of U.S. Provisional Patent Application No. 60/654,848 filed Feb. 18, 2005, the disclosure of which is hereby incorporated by reference.

FIELD OF THE INVENTION

The present invention generally relates to drill chucks and more particularly to a drill chuck having an adjustable depth stop to control an amount by which a tool bit, such as a drill or a screwdriver bit, is inserted into the drill chuck.

BACKGROUND OF THE INVENTION

Tool bits, especially twist drills, are frequently manufactured at different lengths, where the relatively shorter lengths are typically associated with bits of relatively smaller diameters or sizes. With twist drills, for example, small diameter drills tend to be somewhat flexible during use so that relatively long ones will have a tendency to wander or break when employed by the typical operator in a hand drill. When chucking a relatively short twist drill, it is often times necessary to hand position its shank to the jaws of the chuck to guard against contact between the tips of the drill flutes as well as to ensure that a sufficient amount of the drill body extends from the jaws of the chuck. Accordingly, there remains a need in the art for an improved drill chuck having an adjustable depth stop to control an amount by which a tool bit is inserted into the drill chuck.

SUMMARY OF THE INVENTION

In one form, the present teachings provide a chuck having a spindle supporting a plurality of jaws that are adapted to engage a shank of a drill. The chuck can also include a resilient member that is coupled to the spindle and located rearwardly of a front end of the jaws. The resilient member is operable for biasing a drill bit inserted into the chuck in a direction outwardly away from the spindle Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 2 is a perspective view of a portion of the drill chuck of FIG. 1 illustrating the chuck attachment screw and the height adjusting spring in greater detail;

FIG. 3 is a top plan view of a portion of the drill chuck of FIG. 1 illustrating the head of the chuck attachment screw;

FIG. 4 is a top plan view of a portion of the drill chuck of FIG. 1 illustrating the height adjustment spring;

DETAILED DESCRIPTION OF THE PREFERRED EMBODIMENTS

Figure 1:
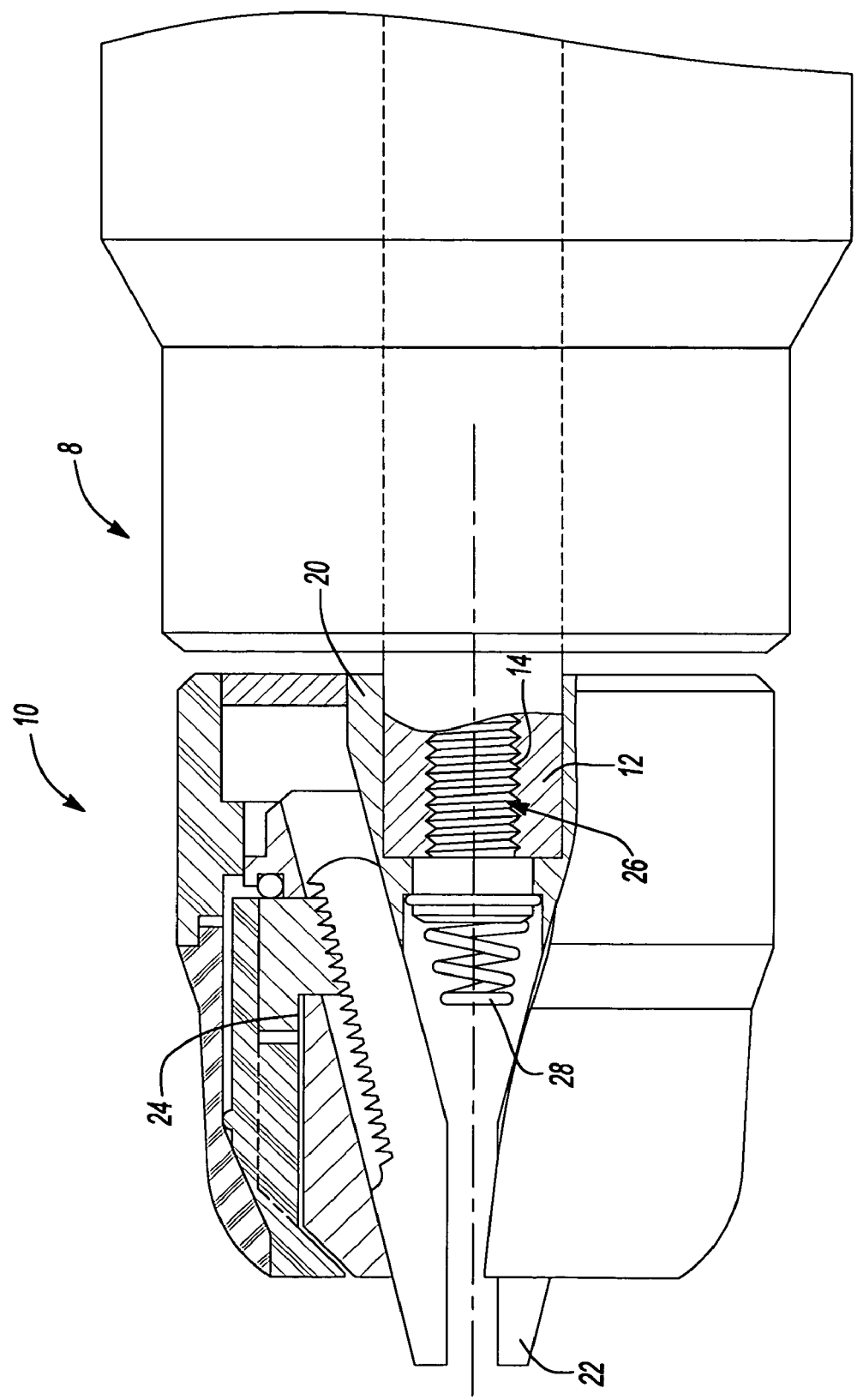
FIG. 1 is a side view in partial section of a drill/driver having a drill chuck constructed in accordance with the teachings of the present invention.

With reference to FIG. 1 of the drawings, a drill/driver 8 that is illustrated to be drivingly associated with a drill chuck 10 constructed in accordance with the teachings of the present invention. The drill/driver 8 can be constructed in a conventional manner and can include an output shaft 12 with a threaded aperture 14.

The drill chuck 10 can be any type of drill chuck (e.g., keyed, keyless, impacting) and except as otherwise described herein, the drill chuck 10 can be conventional in its construction and operation. Accordingly, further details concerning key-type, keyless-type and impacting drill chucks may be found with reference to U.S. Pat. Nos. 3,810,642; 5,330,204 and 6,247,706, all of which are hereby incorporated by reference as if fully set forth herein.

The drill chuck 10 can generally include a spindle 20, a plurality of jaws 22, a nut 24, a chuck attachment screw 26 and a height adjustment spring 28. The spindle 20 may be fixedly but removably coupled to the output shaft 12 through threaded engagement of the chuck attachment screw 26 to the threaded aperture 14 in a conventional and well known manner. The jaws 22 can extend through the spindle 20 and can be threadably engaged to the nut 24 in a conventional and well known manner.

The height adjustment spring 28 can be any type of suitable spring or spring-like (i.e., resilient) member. With additional reference to FIGS. 2 through 4, the height adjustment spring 28 is a conical compression spring having a radially-inwardly extending tab 30 and is configured to engage the head 32 of the chuck attachment screw 26 in the particular provided. More particularly, the head 32 includes a groove 36 into which the tab 30 is received, while one or more coils 28a of the spring 28 are wrapped about the head 32 to maintain the spring 28 in a fixedly but removably coupled condition with the head 32.

The height adjustment spring 28 will tend to deflect in response to the weight of a drill 40 that is inserted into the drill chuck 10. The resilient nature of the height adjustment spring 28 tends to space the end 40a of the drill 40 away from the head 32 of the chuck attachment screw 26 so that the front end of the shank 42 of a relatively small diameter drill 40 can be roughly aligned to the front end of the jaws 22 while the end 40a of a relatively larger and heavier drill, which will typically have a longer length shank, will lie closer in proximity to the head 32 of the chuck attachment screw 26. The relatively weak height adjustment spring 28 can be easily overcome by the operator if a different spacing between the end 40a of the drill 40 and the head 32 of the chuck attachment screw 26 is desired.

Figure 5:
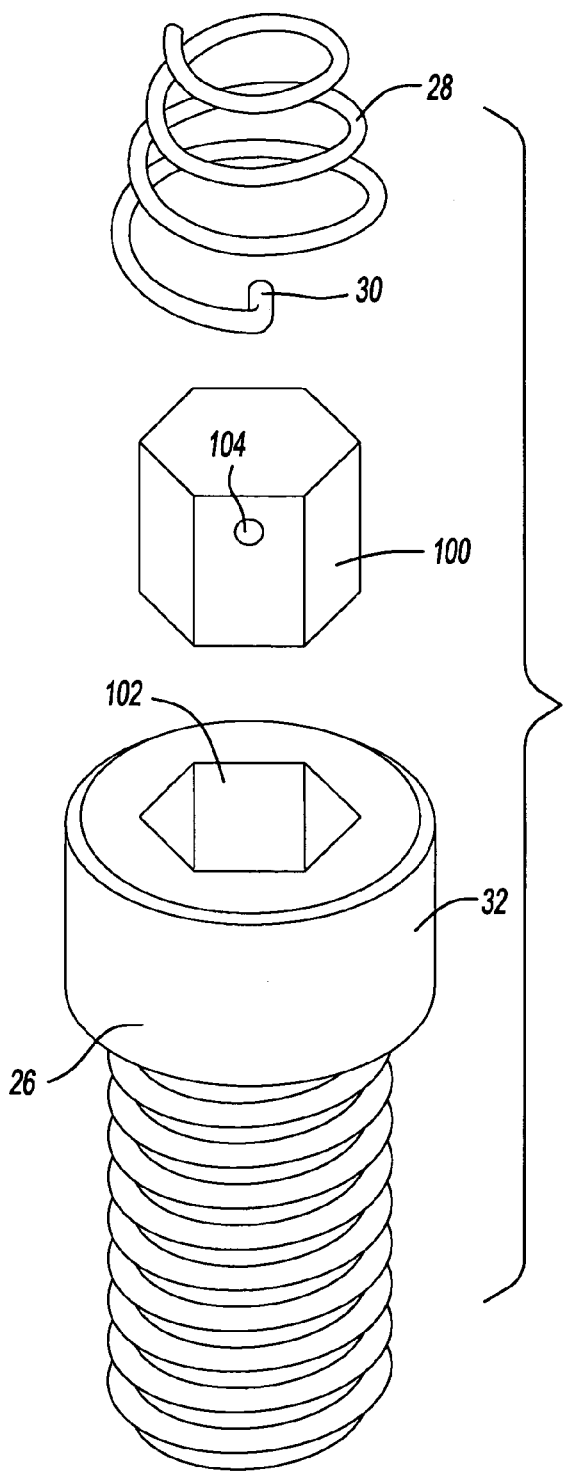
FIG. 5 is an exploded perspective view of a portion of another drill chuck constructed in accordance with the teachings of the present disclosure which specifically illustrates an alternative construction of the chuck attachment screw, the height adjusting spring and a means for coupling the chuck attachment screw and the height adjustment spring.
Figure 6:
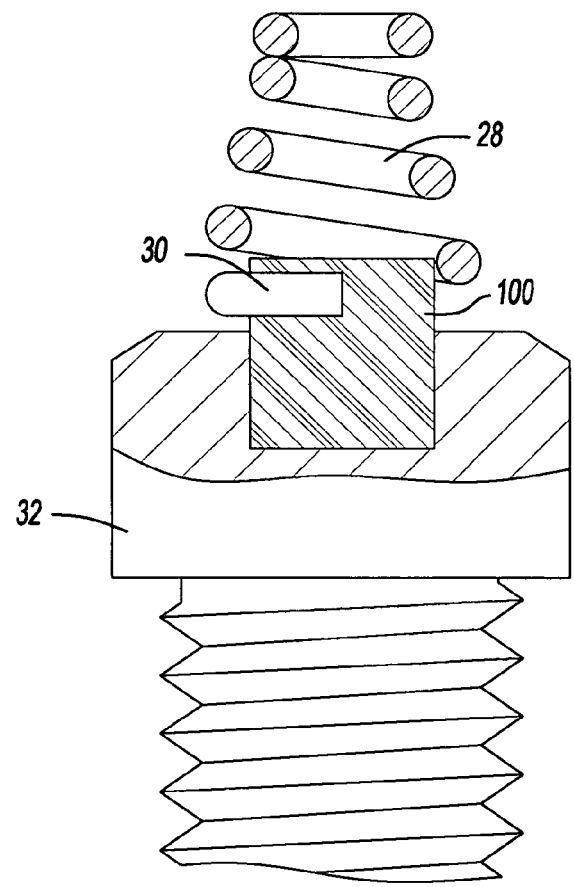
FIG. 6 is a partial longitudinal section view of the portion of the drill chuck of FIG. 5.

While the height adjustment spring 28 has been described herein as being attached to a chuck attachment screw, those of ordinary skill in the art will appreciate from this disclosure that the invention, in its broader aspects, may be constructed somewhat differently. For example, the screw or feature to which the height adjustment spring 28 is coupled may be connected or formed directly on the output spindle of the drill/driver, such as in a situation where the spindle is hollow and internally threaded to engage male threads that are formed on the output spindle. Furthermore, it will be appreciated that an intermediate structure may be employed to couple the height adjustment spring 28 to the spindle as is shown in FIGS. 5 and 6. In this regard, the tab 30 may be inserted to or encased in a plastic material that forms the intermediate structure 100, while the intermediate structure 100 may be sized to be at least partially received into an aperture that can be formed in the spindle, the output spindle or the head 32 of the chuck attachment screw 26 (e.g., the hex shaped socket 102 in the head 32 of a socket head cap screw) as appropriate. In the particular example provided, the tab 30 is inserted into a hole 104 in the intermediate structure 100, at least one coil of the conical coil spring 28 is wrapped about (engaged to) the intermediate structure 100, and the intermediate structure 100 is press-fit into the socket 102 in the head 32 of the chuck attachment screw 26.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A chuck having a chuck spindle supporting a plurality of jaws that are adapted to engage a shank of a drill, the chuck further having a chuck attachment screw with a head, the chuck attachment screw being adapted for coupling the chuck spindle to a rotary spindle of a power tool, the improvement comprising a resilient member coupled to the chuck attachment screw, the resilient member extending forwardly of the head and terminating at a point rearwardly of a front end of the jaws, the resilient member being operable for biasing a drill bit inserted into the chuck in a direction outwardly away from the chuck spindle.

2. The chuck of claim 1, wherein the resilient member is a spring.

3. The chuck of claim 2, wherein the spring includes a radially inwardly extending tab that couples the spring to the chuck spindle.

4. The chuck of claim 3, wherein the tab is disposed within a groove that is formed in the head of the chuck attachment screw.

5. The chuck of claim 4, wherein at least one coil of the spring is wrapped about the head of the chuck attachment screw.

6. The chuck of claim 2, wherein the spring is a conical coil spring.

7. The chuck of claim 4, wherein the resilient member is coupled to an intermediate structure that is fixedly but removably coupled to the chuck attachment screw.

8. The chuck of claim 7, wherein the intermediate structure is a plug or a cap.

9. The chuck of claim 8, wherein the chuck attachment screw includes a socket and wherein the intermediate structure is press-fit into the socket.

10. The chuck of claim 8, wherein the intermediate structure includes a hole and wherein the radially inwardly extending tab of the spring is received in the hole.

11. The chuck of claim 7, wherein the spring is partially encapsulated by the intermediate structure.

12. An apparatus comprising a drill driver with an output spindle and a chuck, the chuck including a chuck spindle, a plurality of jaws, a screw and a resilient member, the screw being employed to removably couple the chuck spindle to the output spindle, the jaws being supported on the chuck spindle and being adapted to engage a shank of a drill, the resilient member being coupled to a head of the screw at a first end, the resilient member extending forwardly of the head of the screw and terminating at a free second end rearwardly of a front end of the jaws, the free second end being deflectable relative to the chuck spindle.

13. The apparatus of claim 12, wherein the resilient member is a spring.

14. The apparatus of claim 13, wherein the spring includes a radially inwardly extending tab that couples the spring to the chuck spindle.

15. The apparatus of claim 14, wherein the tab is disposed within a groove that is formed in the head of the chuck attachment screw.

16. The apparatus of claim 15, wherein at least one coil of the spring is wrapped about the head of the chuck attachment screw.

17. The apparatus of claim 13, wherein the spring is a conical coil spring.

18. The apparatus of claim 15, wherein the resilient member is coupled to an intermediate structure that is fixedly but removably coupled to the chuck attachment screw.

19. The apparatus of claim 18, wherein the chuck attachment screw includes a socket and wherein the intermediate structure is press-fit into the socket.

20. The apparatus of claim 18, wherein the intermediate structure includes a hole and wherein the radially inwardly extending tab of the spring is received in the hole.

21. A chuck having a chuck spindle supporting a plurality of jaws that are adapted to engage a shank of a drill, the improvement comprising a resilient member coupled to the chuck spindle and located rearwardly of a front end of the jaws, the resilient member being operable for biasing a drill bit inserted into the chuck in a direction outwardly away from the chuck spindle, wherein the resilient member is a spring, wherein the spring includes a radially inwardly extending tab that couples the spring to the chuck spindle and wherein the chuck further includes a chuck attachment screw that is adapted to removably couple the chuck to an output spindle of a tool, and wherein the tab is disposed within a groove that is formed in a head of the chuck attachment screw.

22. The chuck of claim 21, wherein at least one coil of the spring is wrapped about the head of the chuck attachment screw.

23. An apparatus comprising a drill driver with an output spindle and a chuck, the chuck including a chuck spindle, a plurality of jaws, and a resilient member, the chuck spindle being removably coupled to the output spindle, the jaws being supported on the chuck spindle and being adapted to engage a shank of a drill, the resilient member being coupled to the chuck spindle and located rearwardly of a front end of the jaws, the resilient member having a first end, which is coupled to the chuck spindle, and a free second end which is deflectable relative to the chuck spindle, wherein the resilient member is a spring, wherein the spring includes a radially inwardly extending tab that couples the spring to the chuck spindle and wherein the chuck further includes a chuck attachment screw that is adapted to removably couple the chuck to an output spindle of a tool, and wherein the tab is disposed within a groove that is formed in a head of the chuck attachment screw.

24. The apparatus of claim 23, wherein at least one coil of the spring is wrapped about the head of the chuck attachment screw.

* * * * *